United States Patent
Rieck et al.

[11] Patent Number: 5,149,167
[45] Date of Patent: Sep. 22, 1992

[54] BODY PANEL FOR A VEHICLE

[75] Inventors: Frank G. Rieck, Oegstgeest; Marcellinus A. M. van Schaik, Maarssen, both of Netherlands

[73] Assignee: Hoogovens Groep B.V., IJmuiden, Netherlands

[21] Appl. No.: 788,457

[22] Filed: Nov. 6, 1991

[30] Foreign Application Priority Data

Nov. 13, 1990 [NL] Netherlands ............ 9002475

[51] Int. Cl.⁵ ............................................ B62D 25/10
[52] U.S. Cl. ........................................ 296/191; 296/76; 296/188; 180/69.2; 52/828
[58] Field of Search .................. 296/76, 191, 188; 180/69.2; 52/828, 827

[56] References Cited

U.S. PATENT DOCUMENTS

| | | | |
|---|---|---|---|
| 2,709,108 | 5/1955 | Eggert, Jr. | 296/76 |
| 4,397,914 | 8/1983 | Miura et al. | 296/188 X |
| 4,451,077 | 5/1984 | Bruhunke et al. | 296/191 X |
| 4,634,167 | 1/1987 | Moriki et al. | 296/76 |

FOREIGN PATENT DOCUMENTS

| | | |
|---|---|---|
| 1627719 | 3/1972 | Fed. Rep. of Germany . |
| 2934430 | 3/1981 | Fed. Rep. of Germany . |
| 57-178925 | 11/1982 | Japan . |
| 60-124575 | 7/1985 | Japan . |

*Primary Examiner*—Robert R. Song
*Attorney, Agent, or Firm*—Stevens, Davis, Miller & Mosher

[57] ABSTRACT

A body panel for a vehicle has a sheet and an elongate supporting structural member of uniform cross sectional shape along its length connected to the sheet for support and for mounting of the sheet to the vehicle. The structural member lies against the sheet, so as to follow the curvature of the sheet. To provide a light yet strong structure, the structural member 3 has, as seen looking at the face of the sheet at least one bend. Two or more bends are preferred. The structural member is an extruded profile, which is adhesively secured to the sheet along its whole length.

12 Claims, 1 Drawing Sheet

BODY PANEL FOR A VEHICLE

BACKGROUND OF THE INVENTION

1. Field of the Invention

The invention relates to a body panel for a vehicle, comprising a sheet formed of one or more layers and a structural member connected to said sheet to support it and provide for mounting of the sheet to the vehicle. The sheet is intended for application as an exterior part of the vehicle.

2. Description of the Prior Art

Such a body panel, for example a bonnet (hood) or a boot (trunk) lid, is known from the practice in the automotive art. This conventional body panel usually consists of a more or less flat sheet which has been given a certain curvature corresponding with the desired appearance of the vehicle in question, and a press-moulded structural member is attached to the inside of the sheet to reinforce the sheet against bending, and by which the sheet is connected to the vehicle. The disadvantage of this known body panel is that it is rather heavy, which is caused in particular by the robust construction of the supporting structural member.

Various attempts have been made to retain strength and rigidity in the body panel while reducing weight. U.S. Pat. No. 2,709,108 is an early attempt to overcome the problem and describes a "Y"-shaped or wishbone reinforcement, in which the two legs of the "Y" reinforce the flat sheet in the region of attachment to the vehicle. DE-A-2934430 describes a hollow strengthening part that is directly bound to a panel. DE-A-1627719 describes the attachment of strengthening members to boots, doors etc. using curable plastics, for example based on PVC. JP-A-57-178925 proposes that a straight reinforcing beam of uniform profile along its length is adhesively secured to the inner face of the panel sheet, to avoid welding marks.

SUMMARY OF THE INVENTION

The object of the invention is to provide a comparatively light, yet strong, body panel which is easy to manufacture.

The body panel in accordance with the invention in one aspect is characterised in that the supporting structural member consists of an elongate element which lies against the sheet and follows the curvature of the sheet and which comprises at least one bend. It has been found that a body panel manufactured in this manner can have the required rigidity lengthwise and widthwise, yet can be constructed much lighter than the conventional body panel described above, due to less material consumption. In particular, the comination of a bent structural member and adhesive face-to-face securing of it to the sheet, provides a light yet rigid structure. In addition the material to be used for the supporting structural member can be of an inferior quality, as its deep drawing properties are less critical than with the press-formed supporting structural member of the conventional panel.

A further significant advantage is that hardly any material is wasted in manufacturing the structural member used in the invention, which enables an inexpensive production. The reason why less material is wasted is that the member to be used can be cut to the required length beforehand, after which only deformation into the desired shape simply needs to take place. The member and the sheet can be joined using known connecting techniques, such as for example by glueing or riveting.

The invention is well applicable to sheets made of steel but also a particularly good application is possible to sheets made of aluminium or to a laminate having skin layers of aluminium or steel and a thermoplastics core.

In another aspect, the invention consists in a body panel having a sheet and connected thereto an elongate supporting structural member having at least two bends.

In particular, an even more robust construction of the body panel in accordance with the invention is achieved by providing the member along its length with three bends and four portions of lesser curvature (e.g. straight), the bends and the portions alternating, with the extremities of the member formed by two of the portions. The middle bend is in the opposite direction to that of the other two. This gives the member a "Cupid's bow" shape. In this manner the entire area of the sheet to be supported can be subdivided into three about equally large areas. Using the supporting member which thus follows the curved surface of the sheet, a very effective support and resistance to bending is achieved in the sheet surface.

Preferably the two extremities of the member support the sheet at or near a side edge which is intended for mounting to the vehicle. In this manner the supporting function of the member is best combined with the function of mounting the body panel to the vehicle. Furthermore, the middle bend of the member preferably also supports the sheet adjacent that side edge which is intended for mounting to the vehicle. Then the division into areas mentioned earlier can produce optimum effects for the ability of the integral body panel to retain its shape.

Preferably the structural member is made using substantially the same material, or the same type of material, as at least the layer of the sheet against which it directly abuts. In this manner differences in the thermal expansion of the sheet and the supporting member are prevented as much as possible and in addition, susceptibility to contact corrosion is avoided.

In a preferred embodiment of the body panel in accordance with the invention, the panel is entirely made of aluminium (by which term, we include aluminium alloys). In this manner a very light and manageable construction is provided, which has the added benefit that the structural member in aluminium can be manufactured in a very simple and inexpensive manner by extrusion followed by a bending operation. The profile of the element may be flat, which allows good attachment to the body panel.

Typically, the sheet has curvature in at least one plane, often in two planes, and the structural member lying against the sheet follows this curvature.

INTRODUCTION OF THE DRAWINGS

The invention will now be illustrated further with reference to the accompanying drawing, which shows a non-limitative embodiment, by way of example. In the drawing:

FIG. 1 shows an under view of a body panel in accordance with the invention.

DESCRIPTION OF THE PREFERRED EMBODIMENT

Figure 1:
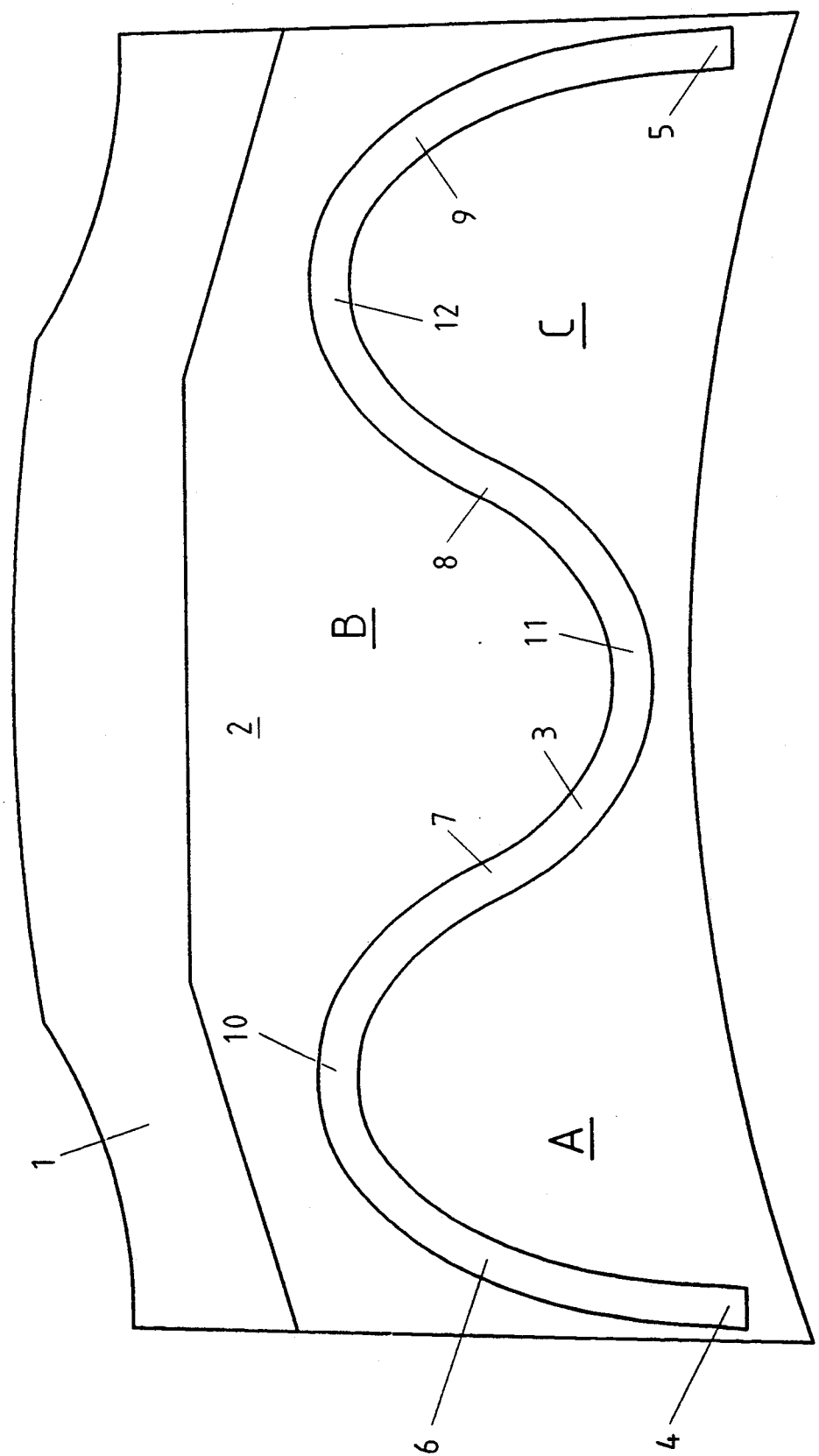

FIG. 1 is an underneath plan view of a body panel embodying the invention, consisting of an aluminium sheet 2, whose underface 1 is seen, an a reinforcing structural member 3. The sheet 2 has, in conventional manner, double curvature, i.e. curvature in two planes, though this is not visible in the Figure. When fitted to a vehicle the panel is pivotable about a line adjacent to its lower side edge in FIG. 1

The structural member 3 is an elongate extrusion of aluminium of flat cross-section which is uniform along its length. This profile is hollow to save weight and material, and may be provided with reinforcing ribs (not shown). One of its flat faces is adhesively bonded continuously to the underface 1 of the sheet 2 over the whole length of the member 3. The height of the member 3 in the direction perpendicular to the paper in FIG. 1 is less than its width.

The member 3 has extremities 4 and 5 and can be seen to consist of four more or less straight parts 6,7,8 and 9 which alternate with three bends 10,11 and 12. The middle bend 12 is in the opposite direction relative to the outer bends 10,12. This gives the member a "Cupid's bow" shape, as seen in FIG. 1.

The member 3 follows the curvature of the underside 1 of the body panel sheet 2 over its entire length, and it is fixed to the sheet 2, for example by glueing, as mentioned. Suitable glues are known. The shape of the member 3 defines areas A, B, C which are preferably chosen to be approximately equal in size. Both extremities 4 and 5 are suitable to be used as fastening points for connecting the body panel 1 to the vehicle for which it is intended. This may be done by bolting triangular flanges (not shown) to the member 3 at the extremities 4,5.

In this embodiment both the underside 1 of the sheet 2 and the member 3 are made of the same material, aluminium. This provides a particularly light and manageable construction, which is yet resistant to bending and which can nevertheless be manufactured at low cost. With this invention a saving in weight by approximately twenty per cent as compared to the conventional panel mentioned above has been found possible. A steel body panel manufactured by the conventional technique weighs approximately ten kilograms, whereas a similar body panel in accordance with the invention as illustrated weighs approximately eight kilograms, and a body panel in accordance with the invention in which the sheet is formed by a laminate with aluminium skin layers and a plastics core layer and the supporting member 3 is also made of aluminium may weigh approximately four kilograms.

What is claimed is:

1. A body panel for a vehicle intended for use as an exterior part of the vehicle, comprising a sheet formed of at least one layer and having opposite faces, and an elongate structural member connected to said sheet so as to support said sheet and intended for use in mounting the body panel to a vehicle, wherein said structural member is of uniform cross-sectional shape along its length and lies against one said face of said sheet so as to follow the shape of said sheet, said structural member having, as seen looking at said one face of said sheet, at least one bend and portions extending away from said bend.

2. A body panel according to claim 1 wherein said structural member has three said bends and four said portions extending away from said bends, said portions having lesser curvature than said bends, said three bends and said four portions alternating along the length of said structural member, and wherein a middle one of said bends, which along the length of said structural member is between the other two of said bends, has curvature in the opposite direction to the curvature of said other two bends, said structural member having two lengthwise extremities which are formed by two of said portions thereof.

3. A body panel according to claim 1 wherein said body panel has an edge at which it is intended to be mounted to a vehicle, and said structural member has lengthwise extremities which support said sheet at regions adjacent said edge.

4. A body panel according to claim 1 wherein said body panel has an edge at which it is intended to be mounted to a vehicle and at least one said bend of said structural member supports said sheet adjacent said edge.

5. A body panel according to claim 1 wherein said structural member and at least said one face of said sheet against which said structural member lies are made of substantially the same material.

6. A body panel according to claim 1 wherein said structural member is made of aluminium.

7. A body panel according to claim 6 wherein said structural member is an aluminium extrusion.

8. A body panel according to claim 1 wherein said structural member is secured to said sheet by adhesive over substantially its whole length.

9. A body panel according to claim 1 wherein said sheet has curvature in at least one plane, and said structural member follows said curvature of said sheet.

10. A body panel for a vehicle intended for use as an exterior part of the vehicle, comprising a sheet formed of at least one layer and having opposite faces, and an elongate structural member connected to said sheet so as to support said sheet and intended for use in mounting the body panel to a vehicle, wherein said structural member lies against one said face of said sheet so as to follow the shape of said sheet, said structural member having, as seen looking at said one face of said sheet, at least two bends in mutually opposite directions.

11. A body panel according to claim 10 wherein said structural member is an extrusion having a uniform cross-sectional shape along its length.

12. A body panel according to claim 10 wherein said structural member has, along its length, three said bends, of which the middle one lengthwise of the structural member is in a direction opposite to that of the other two, the line of said structural member across said sheet dividing said sheet into three areas of approximately equal size.

* * * * *